United States Patent
Lestienne et al.

(10) Patent No.: US 8,746,094 B2
(45) Date of Patent: Jun. 10, 2014

(54) DEVICE FOR CONVERTING ROTATIONAL MOVEMENT INTO TRANSLATIONAL MOVEMENT

(75) Inventors: Stéphane Lestienne, Deuil la Barre (FR); Gabriel Ridolfi, Hacqueville (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 91 days.

(21) Appl. No.: 13/517,194

(22) PCT Filed: Dec. 22, 2010

(86) PCT No.: PCT/EP2010/070596
§ 371 (c)(1),
(2), (4) Date: Aug. 23, 2012

(87) PCT Pub. No.: WO2011/076902
PCT Pub. Date: Jun. 30, 2011

(65) Prior Publication Data
US 2012/0312107 A1    Dec. 13, 2012

(30) Foreign Application Priority Data

Dec. 22, 2009 (FR) ..................... 09 06236

(51) Int. Cl.
*F16H 21/18* (2006.01)
(52) U.S. Cl.
USPC ............................................................. 74/50
(58) Field of Classification Search
USPC ..................... 74/25, 50, 53, 54, 55
See application file for complete search history.

(56) References Cited

U.S. PATENT DOCUMENTS

| 2,019,158 | A  | * | 10/1935 | Russell ........................ 74/55 |
| 3,349,632 | A  |   | 10/1967 | Vulliez |
| 6,062,826 | A  | * | 5/2000  | Morimoto et al. ............ 417/297 |
| 6,073,503 | A  | * | 6/2000  | Matsuno et al. .................. 74/55 |
| 6,886,546 | B1 |   | 5/2005  | Bircann et al. |
| 2012/0222507 | A1 | * | 9/2012 | Toennesmann et al. .......... 74/55 |

FOREIGN PATENT DOCUMENTS

FR    2 914 975 A1    10/2008

OTHER PUBLICATIONS

International Search Report issued in PCT/EP2010/070596, mailed on Mar. 2, 2011, with translation, 4 pages.

* cited by examiner

*Primary Examiner* — Justin Krause
(74) *Attorney, Agent, or Firm* — Osha Liang LLP

(57) ABSTRACT

The invention relates to a device for converting a rotational movement into a translational movement, said device comprising: a first element (303) that is rotated around a stationary center of rotation (401) by a rotation means (301); a second element (307) that is translated along a translation axis (311) by rotating the first element (303); a cam (305) that is rigidly connected to the first element (303), said cam (305) having a cam channel (306) in which a roller (308) moves, wherein said roller is rigidly connected to the second element (307). Said device is characterized in that the cam channel (306) has an inner surface (402) for contact with the roller (308), said roller (308) being in contact (500) with the inner contact surface (402) when the first element (303) is rotated in a first rotational direction (404), said inner contact surface (402) defining a curve of the type developing from a circle.

5 Claims, 2 Drawing Sheets

DEVICE FOR CONVERTING ROTATIONAL MOVEMENT INTO TRANSLATIONAL MOVEMENT

TECHNICAL FIELD OF THE INVENTION

The present invention consists in a device for converting a rotational movement into a translational movement. The invention relates generally to all driver actuator type mechanisms including such a movement conversion device.

The general field of the invention is that of driver actuators the function of which is to convert rotational movement, driven directly by the driver, into translational movement, intended to cause a mechanical part to move in translation.

This type of actuator is used for example to move exhaust gas recirculation (EGR) type valves in so-called EGR circuits. Such circuits are mainly used in diesel engines to reduce the quantity of pollutants in the exhaust of the motor vehicle by reintroducing into the engine a portion of the exhaust gases. Accordingly, in this context, the inert gas or the mixture of inert gases constituted by burned exhaust gases recovered at the outlet of the combustion chamber is reintroduced into the inlet conduit and then into the combustion chamber of the engine. The quantity of burned exhaust gases reintroduced into the inlet circuit is controlled by means of an EGR valve that obstructs to a greater or lesser degree the conduit through which the burned exhaust gases flow. The movement conversion device of the invention is entirely suited to EGR valves, but may obviously be used with any driver at least one of the functions of which is conversion of rotational movement into translational movement, for example actuators controlling bypasses, valves, or square flap or butterfly valve type elements intended to move in translation.

TECHNOLOGICAL BACKGROUND OF THE INVENTION

In the prior art there are essentially two known types of device converting a rotational movement into a translational movement.

The operation of the first type of device is illustrated in FIG. 1. In that figure there is diagrammatically represented, in a first position 110 and in a second position 111, a device 100 for conversion of rotational movement into translational movement. The device 100 essentially includes:

a first rod 101 forming a link, designed to move in rotation about a fixed rotation axis 103, said rotation being driven by a driver that is not shown;

a second rod 102, designed to move in translation in a translation direction 106 perpendicular to said rotation axis 103; the translational movement of the second rod 102 is produced by the presence in the first rod 101 of a straight opening 104 forming a guide in which a roller 105 fastened to the second rod 102 can move. By causing rotation of the first rod 101, the driver drives the movement of the roller 105 in the guide 104, thus causing the translational movement of the second rod 102.

In this first type of device, a distance D1 between the translation direction 106 and the rotation axis 103 is constant. Consequently, the lever arm corresponding to a distance D2 between the rotation axis 103 and the position of the roller 105 varies as a function of the position of the first rod 101. There is thus observed an evolution of the direction of a force F1 during rotation of the first rod 101; the change of direction of the force F1 leads to the creation of a mechanical moment on the second rod 102 which increases the friction on the guide 104 of the first rod 101. As the roller 105 moves away from the rotation axis 103, the force F1, as the rotation of the first rod 101 evolves, is in a direction that increasingly departs from the direction of the translation axis 106. There is therefore less and less push on the translation axis 106, the force produced by the driver becoming less and less effective in terms of the push intended to cause translational movement of the second rod 102. Accordingly, in this first type of device, there is observed rapid wear of the various elements (notably the guide 104 and the roller 105), and the energy supplied by the driver is not used optimally.

The operation of the second type of prior art device for conversion of a rotational movement into a translational movement is illustrated in FIG. 2. In that figure there is diagrammatically represented, in a first position 210 and in a second position 211, a device 200 for conversion of rotational movement into translational movement. The device 200 essentially includes:

a first rod 201 forming a link, designed to move in rotation about a fixed rotation axis 203, said rotation being driven by a drive that is not shown;

a second rod 202, designed to move in translation in a translation direction 206 perpendicular to said rotation axis 203; the translational movement of the second rod 202 is produced by the presence, at the level of the upper portion of the second rod 202, of a bearing 204 at the level of which an end 205 of the first rod 201 bears to cause the second rod 202 to descend in a translational movement when the first rod 201 is, in the example considered, driven in a rotational movement in the clockwise direction. The bearing 204 is complemented by an upper part 207 on which the end 205 of the first rod 201 bears to cause the second rod 202 to be raised along the translation axis 206 when, in the example considered here, the first rod 201 is in a rotational movement in the anticlockwise direction.

In this second type of device, the force applied to the bearing 204 or to the upper part 207 is not constant, and a torque is created at the level of the bearing 204 or the upper part 207, the force exerted by the end 205 becoming more and more off-axis as the movement evolves, as shown by an arrow 208 indicating the direction of pushing on the end 205, the pushing direction 208, which no longer coincides with the central part of the second rod 202. Such a torque has the consequence of wear of the bearing 204 in particular.

The different types of device thus do not enable solutions to be provided in which a constant force, provided by an element or contact of a first rod on a second rod designed to move in translation, is oriented on the axis of said second rod, creating no torque on a contact surface between the contact element and a bearing area of the second rod.

GENERAL DESCRIPTION OF THE INVENTION

The method of the invention proposes a solution to the problem that has just been stated. The invention proposes a device having a movement conversion law, for going from a rotational movement to a translational movement, enabling a constant force to be obtained, applied at least at the level of an element mobile in translation, over all of a range of positions covered by an element mobile in rotation driving said element mobile in translation, said force being oriented as close as possible to the translation direction concerned, being centred on the axis of the translation element. Thus the forces creating a mechanical moment on the element in translation are minimized, the efficiency of the movement conversion mechanism therefore being optimized.

To this end, the invention proposes the use of a cam having a cam path of particular shape, said cam being fastened to the element in rotation, the element in translation being fastened to a part moving in the cam path of particular shape. According to the invention, the particular shape of the cam path concerned is, at the level at least of one of its rims, of the type developed from a circle.

Thus the invention essentially concerns a device for conversion of a rotational movement into a translational movement, said device including:
- a first element driven in rotation about a fixed rotation centre by rotation drive means;
- a second element driven in translation along a translation axis by rotation of the first element;
- a cam fastened to the first element, said cam having a cam path in which moves a roller fastened to the second element;
- characterized in that the cam path has an interior surface of contact with the roller, said roller being in contact with the interior contact surface when the first element is driven in rotation in a first rotation direction, said interior contact surface defining a curve of the type developed from a circle.

The device of the invention may have, in addition to the main features that have just been mentioned in the preceding paragraph, one or more additional features from among the following:
- the curve of the type developed from a circle has a primitive radius equal to a distance observed between the rotation centre and the translation axis;
- the cam path has an exterior contact surface in contact with the roller when the first element is driven in rotation in a second rotation direction;
- the exterior contact surface defines a particular curve of which each point of contact with the roller has a direction normal to said curve, said normal direction coinciding with the translation axis.

The various additional features of the device of the invention, to the degree that they are not mutually exclusive, are combined in all possible associations to yield different embodiments of the invention.

The present invention also relates to an actuator including a device of the invention for conversion of a rotational movement into a translational movement.

The invention and its various applications will be better understood after reading the following description and examining the accompanying figures.

BRIEF DESCRIPTION OF THE FIGURES

The latter figures are provided by way of indication only and are in no way limiting on the invention. The figures show.

DESCRIPTION OF PREFERRED EMBODIMENTS OF THE INVENTION

Elements appearing in different figures will have retained the same references unless otherwise indicated.

Figure 1:
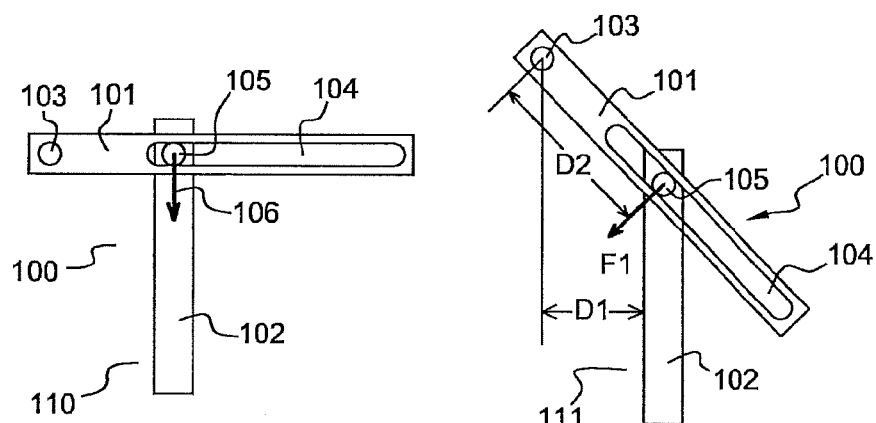
- in FIG. 1, already described, a first type of prior art device providing conversion of a rotational movement into a translation movement.
Figure 2:
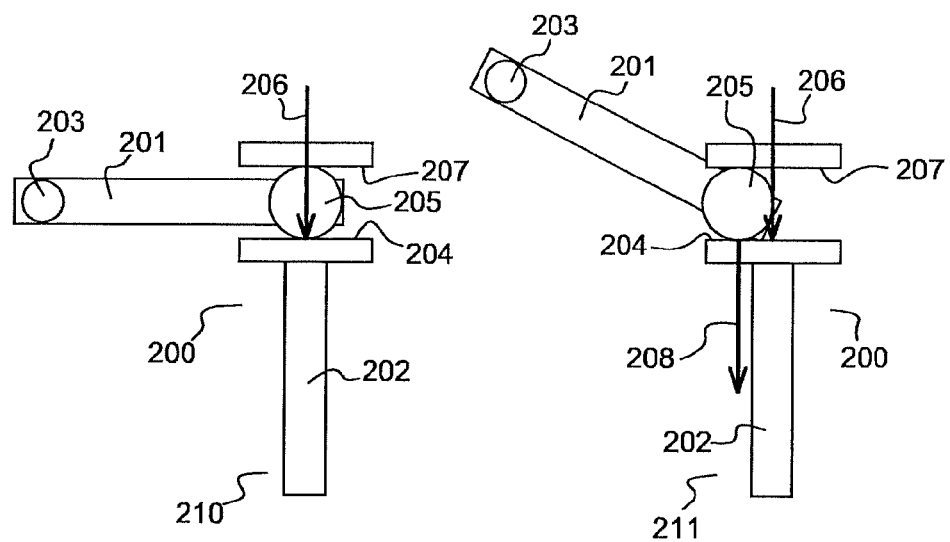
- in FIG. 2, already described, a second type of prior art device providing conversion of a rotational movement into a translation movement.
Figure 3:
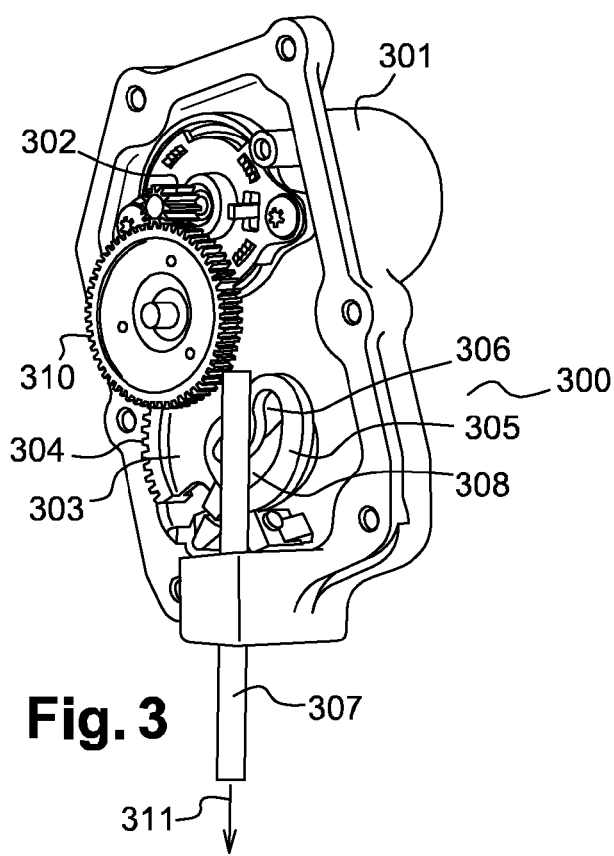
- in FIG. 3, a representation of an actuator including an example of a device of the invention.

FIG. 3 represents a valve 300, which is of the EGR valve actuator type in the example shown, including:
- a drive element 301 adapted to drive in rotation a first toothed wheel 302;
- an intermediate toothed wheel 310 driven in rotation by the first toothed wheel 302;
- a first element 303 of an example of a device of the invention, said first element being constituted here by a mechanical part having a toothed portion 304 forming a gear with the intermediate toothed wheel 310 so as to be driven in rotation when the drive element 301 is active;
- a cam 305 fastened to the first element 303; the cam 305 is thus caused to rotate when the drive element 301 is active; the cam 305 has a cam path 306;
- a second element 307 of an example of a device of the invention, said second element 307 being constituted here by a mechanical part in the form of a rod having a roller type portion 308 adapted to move in the cam path 306 when the first element 303 moves with a rotational movement; the movement of the cam path 306 drives, via the roller 308, the movement of the rod 307 with a translational movement along a translation axis 311. To increase the stability of the rod 307, there is advantageously provided in the EGR valve actuator 300 an orifice 309 in the material constituting the valve actuator 300, said orifice allowing the rod 307 to slide during the translational movement.

Figure 4:
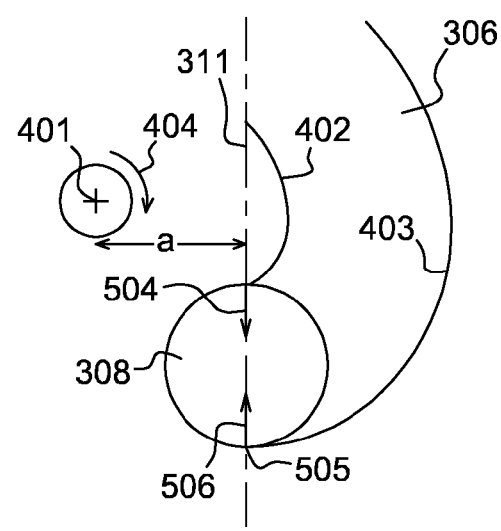
- in FIG. 4, a diagrammatic representation of a cam path operative in one example of a device of the invention.
Figure 5:
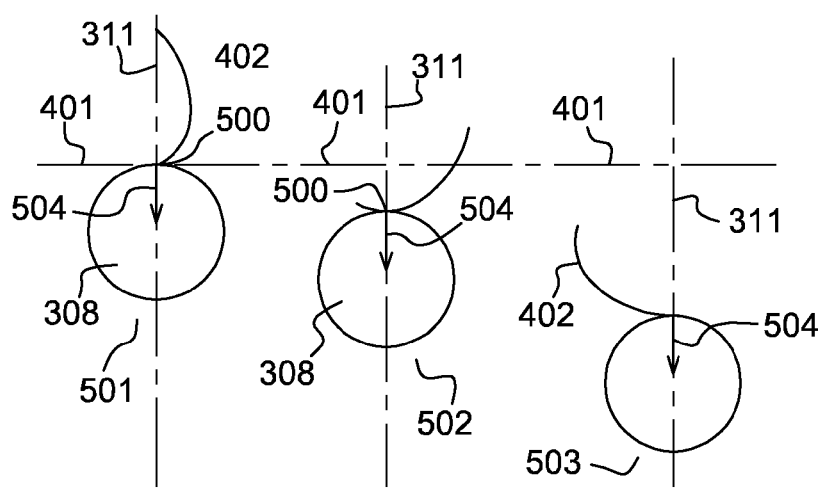
- in FIG. 5, different diagrammatic representations illustrating the determination of the shape of the cam path operative in the embodiment of the device of the invention from FIG. 4.

FIG. 4 shows a diagrammatic representation of a portion of the cam path 306 operative in the device of the invention. FIG. 4 is described in conjunction with FIG. 5, which illustrates the determination of the shape of the cam path 306 of the device of the invention.

In FIG. 4 there has been represented the centre 401 of rotation of the rotational movement of the first element 303 and a portion of the cam path 306 movement of which is driven by the rotation of said first element 303 and causes movement of the roller 308 relative to the cam path 306. In the example considered here, the cam path 306 has an interior surface 402 defining a first curve and an exterior surface 403 defining a second curve. The interior surface 402 is distinguished from the exterior surface 403 by designating the interior surface 402 as being the surface, of the two surfaces concerned, nearer the rotation centre 401, the exterior surface 403 consequently being the surface, of the two surfaces concerned, farther from the rotation centre 401.

The interior surface 402 is constituted by a surface in contact with the roller, at least when the rotation of the first element 303 is observed in a first rotation direction 404; in the example represented, the interior surface 402 is in contact with the roller when the first element 303 is rotating clockwise, driving the roller 308, and therefore the second element 307, in a downward translational movement by a push exerted by said interior surface 402 on the roller 308.

According to the invention, the interior surface 402 has the shape of a particular curve, of the type developed from a circle. Such a curve has a parametric cartesian equation of the following form, referred to a classic orthonomic frame of reference:

$$\begin{cases} x(t) = a \times (\cos(t) + t \times \sin(t)) \\ y(t) = a \times (\sin(t) - t \times \cos(t)) \end{cases}$$

where a is the primitive radius of the type developed from a circle concerned and where t is the parameter of the parametric equation.

By proposing a curve with such a shape there is obtained, in accordance with the invention, a movement conversion law that enables not only a constant force to be obtained over all of the range of movement of the first element 303, said force being moreover oriented in the direction of the translation axis 208 of the second element 307, which enables the forces creating a moment on the rod and that reduce the efficiency of the mechanism to be minimized. These physical characteristics stem from the fact that by proposing as the shape of the interior surface 402 a curve of the type developed from a circle, the normal to the curve at the level of a point of contact 500, visible in FIG. 5, coincides with the axis of the rod 307, and thus with the translation axis 311, for all of the range of rotation of the first element 303, as visible for a first position 501, a second position 502 and a third position 503. Thus the force transmitted to the rod 307 via the roller 508 is no longer a component of the torque but the resultant and its orientation is that of the axis of the rod 307.

In the invention, the cam path 306 advantageously includes the exterior contact surface 403, to form a circumscribing curve enabling the return to the initial position of the rod 307; the exterior contact surface 403 is in contact with the roller 308 when the first element 303 is driven in rotation in a rotation direction opposite to the rotation direction 404. In an advantageous embodiment, the exterior contact surface 403 defines a particular curve on which each point 505 of contact with the roller 308 has a direction 506 normal to the curve 403, said normal direction 506 coinciding with the axis of the rod 307, and thus with the translation axis 311, for all of the range of rotation of the first element 303.

The invention claimed is:

1. A device for conversion of a rotational movement into a translational movement, comprising:
    a first element driven in rotation about a fixed rotation centre by rotation drive means;
    a second element driven in translation along a translation axis by rotation of the first element;
    a cam fastened to the first element, said cam having a cam path in which moves a roller fastened to the second element;
    wherein the cam path has an interior surface of contact with the roller, said roller being in contact with the interior contact surface when the first element is driven in rotation in a first rotation direction, said interior contact surface is defined by the parametric equations $$x(t) = a \times (\cos(t) + t \times (\sin(t))$$

and $$y(t) = a \times (\sin(t) - t \times (\cos(t))$$

where 'a' is a primitive radius of a circle.

2. The device according to claim 1, wherein the primitive radius of the circle is equal to a distance observed between the fixed rotation centre and the translation axis.

3. The device according to claim 1, wherein the cam path has an exterior contact surface in contact with the roller when the first element is driven in rotation in a second rotation direction.

4. The device according to claim 3, wherein the exterior contact surface defines a particular curve of which each point of contact with the roller has a direction normal to said particular curve, said normal direction coinciding with the translation axis of the second element.

5. An actuator comprising a device according to claim 1 for conversion of a rotational movement into a translational movement.

* * * * *